No. 627,133. Patented June 20, 1899.
W. M. McDOUGALL.
ELECTRIC VEHICLE.
(Application filed Aug. 4, 1898.)

(No Model.)

WITNESSES: INVENTOR
Wm. M. McDougall
BY
ATTORNEY

UNITED STATES PATENT OFFICE.

WILLIAM M. McDOUGALL, OF EAST ORANGE, NEW JERSEY.

ELECTRIC VEHICLE.

SPECIFICATION forming part of Letters Patent No. 627,133, dated June 20, 1899.

Application filed August 4, 1898. Serial No. 687,685. (No model.)

*To all whom it may concern:*

Be it known that I, WILLIAM M. MCDOUGALL, a citizen of the United States, residing at East Orange, in the county of Essex and State of New Jersey, have invented certain new and useful Improvements in Electric Vehicles, of which the following is a full, clear, and exact description.

This invention relates to motive-power mechanism especially adapted for automobile vehicles, although the invention is also applicable to any electrically-propelled vehicle.

In electric carriages receiving their power from a storage battery one of the greatest causes for deterioration of the battery is the violent strain put upon it by reason of the grades over which the vehicle travels. My invention is a mechanical appliance for changing the gearing between the motor-shaft and the axle, so as to enable the former to run at a substantially constant speed, thus maintaining a constant counter electromotive force and a constant output of the battery. In carrying out my invention I provide for bodily moving the motor or the motor-shaft in such a way as to throw the pinion on the motor-shaft out of engagement with one gear and into engagement with another gear of different pitch, and since the two gears referred to are respectively an external or spur gear and an internal gear my invention also comprehends mechanism for simultaneously changing the direction of rotation of the motor.

The invention will be described with reference to the accompanying drawings, in which—

Figure 1:
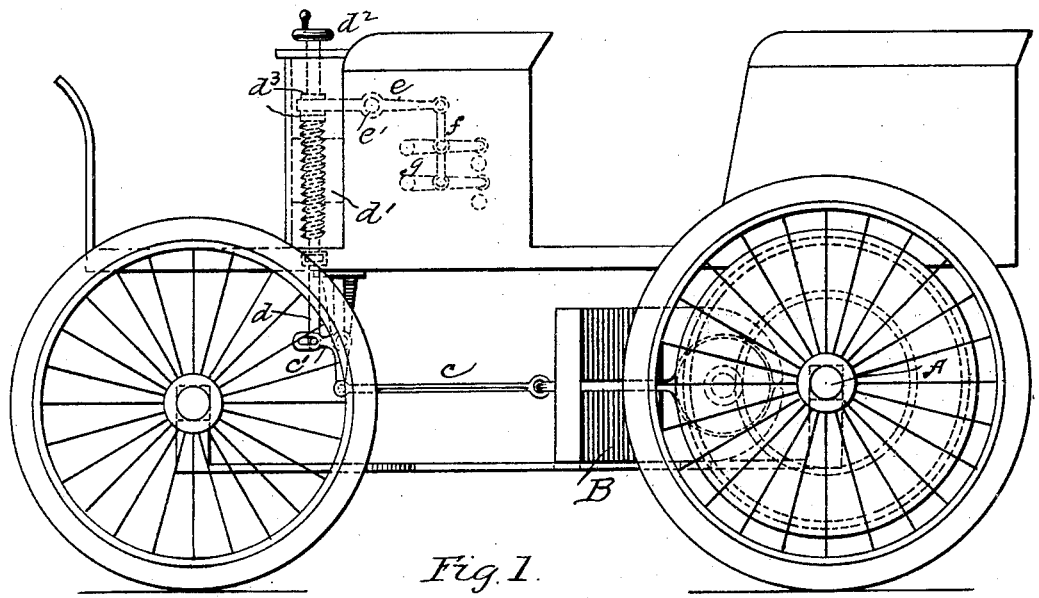
Figure 2:
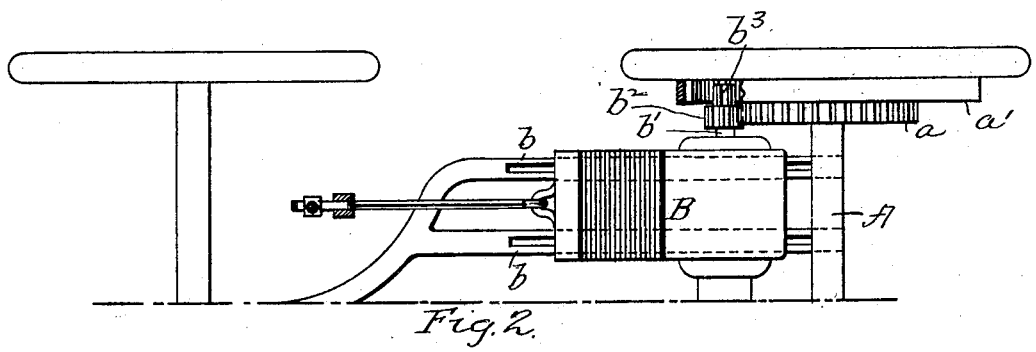

Figure 1 is a side elevation of an electric carriage with parts broken away to more clearly illustrate the invention. Fig. 2 is a plan of portions of the running-gear, showing an arrangement for shifting the position of the motor bodily; and Fig. 3 is a similar plan showing an arrangement for shifting the armature-shaft only of the motor.

A represents the driven axle of the carriage. On each end and adjacent to each wheel thereof are two gear-wheels $a$ and $a'$, respectively, placed in parallel planes, the former being a spur-gear and the latter an internal gear.
The vehicle is driven by two motors B, one for each driving-wheel. In accordance with the plan shown in Fig. 2 the motors are mounted on guides $b$, upon which they are adapted to slide in a fore-and-aft direction. The armature-shaft (represented by $b'$) projects into the space between the pitch-lines of the two gears and carries two pinions $b^2$ and $b^3$, the former adapted to engage with the gear $a$ and the latter with the gear $a'$, pinion $b^3$ being somewhat smaller than $b^2$ in order to get a sufficient difference of speed without a great bodily movement of the motor or its shaft. A link $c$ connects the motor-frame with a pivoted lever $c'$, and also connected with this lever is an upwardly-extending threaded rod $d$, passing through a fixed nut $d'$ and fitted at its upper end with a hand-wheel $d^2$. It will be seen that as the hand-wheel is rotated in one direction or the other the motor will be moved forward or backward on the guides $b$, and in this way the pinions $b^2$ and $b^3$ may be thrown into and out of engagement with their respective gears $a$ and $a'$. On the rod $d$ are arranged two collars $d^3$, between which the forked end of a lever $e$ stands. This lever, which is pivoted at $e'$, is connected with the shifting rod $f$ of a pole-changing switch $g$, which is adapted to change the direction of current through either the armature or field-magnet of the motor, and thus change its direction of rotation. With this mechanism the shifting of the motor-pinions from one gear to the other is accompanied by a reversal of current, and consequently reversal of rotation of the motor-armature.

Figure 3:
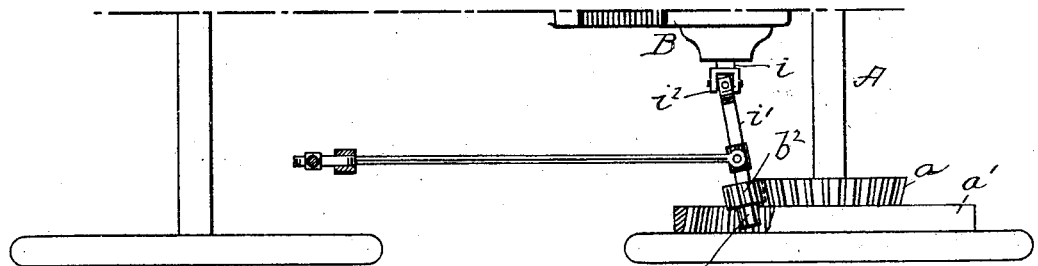

In Fig. 3 an alternative form of mechanism is illustrated. Here, instead of moving the motor bodily, only a portion of its armature-shaft is moved. The shaft is made in two sections, one, $i$, carrying the armature and the other, $i'$, carrying the pinions. The two sections are connected together at $i^2$ by a universal joint, which permits the section to rotate although standing at an angle to the other section. The mechanism for shifting this movable section of the shaft so as to throw one pinion or the other into engagement with the gears is the same as that used for shifting the motor bodily and needs no further description. Likewise the same pole-changing switch will be used.

When the vehicle is running downgrade or on a level, the motor-shaft will be adjusted so that pinion $b^2$ will be in engagement with the gear $a$. When running up a grade of any consequence, the motor-shaft will be shifted to throw pinion $b^2$ out of engagement with gear $a$ and pinion $b^3$ into engagement with gear $a'$. Thus the carriage will be given a slower speed, while the motor-shaft will run at substantially the same speed and the draft upon the battery will be substantially constant.

Having described my invention, I claim—

1. In an electrically-propelled vehicle, the combination of a plurality of gear-wheels, an electric motor and its shaft and means for shifting the motor bodily to throw its shaft into and out of mesh with said gear-wheels, substantially as described.

2. In an electrically-propelled vehicle, the combination of two gear-wheels, one external and the other internal gear, an armature-shaft located between the pitch-lines of the two gears, and means for shifting the armature-shaft laterally to throw it out of engagement with one gear and into engagement with the other, and means for simultaneously reversing the direction of rotation of the motor, substantially as described.

3. In an electrically-propelled vehicle, the combination of a plurality of gear-wheels, an electric motor and its shaft, a system of levers by which the shaft is moved to engage with one or the other of said gears, a pole-changing switch controlling current to the motor and connected with said system of levers and means for manually moving the system of levers, substantially as described.

In witness whereof I subscribe my signature in presence of two witnesses.

WILLIAM M. McDOUGALL.

Witnesses:
 WM. A. ROSENBAUM,
 GEO. S. KENNEDY.